United States Patent [19]

Hughes et al.

[11] 4,314,044

[45] Feb. 2, 1982

[54] PROCESS FOR PREPARING LOW MOLECULAR WEIGHT WATER-SOLUBLE POLYMERS

[75] Inventors: Kathleen A. Hughes, Plymouth Meeting; Benjamin B. Kine, Elkins Park; Graham Swift, Blue Bell, all of Pa.

[73] Assignee: Rohm and Haas Company, Philadelphia, Pa.

[21] Appl. No.: 152,011

[22] Filed: May 21, 1980

Related U.S. Application Data

[63] Continuation-in-part of Ser. No. 4,974, Jan. 22, 1979, abandoned.

[51] Int. Cl.$^3$ ............................. C08F 4/40; C08F 2/16
[52] U.S. Cl. .............................. 260/29.6 M; 526/91; 526/303.1; 526/317
[58] Field of Search ........................................ 526/91

[56] References Cited

U.S. PATENT DOCUMENTS

| | | | |
|---|---|---|---|
| 2,789,099 | 4/1957 | Rife | 526/91 X |
| 3,040,012 | 6/1962 | Maeder | 526/93 X |
| 3,069,389 | 12/1962 | Welch | 526/315 X |
| 3,079,296 | 2/1963 | Houff | 526/315 X |
| 3,135,722 | 6/1964 | Logemann | 526/91 X |
| 3,332,922 | 7/1967 | Hoover | 526/303 X |
| 3,405,095 | 10/1968 | Hartel | 526/91 |
| 3,936,423 | 2/1976 | Randazzo | 526/315 X |

FOREIGN PATENT DOCUMENTS

696969  11/1964  Canada ................................. 526/91

*Primary Examiner*—C. A. Henderson
*Attorney, Agent, or Firm*—Jordan J. Driks

[57] ABSTRACT

A process for preparing a low molecular weight water-soluble polymer comprises reacting, in an aqueous solution system, a water-soluble monomer selected from the class consisting of (a) acrylic acid, methacrylic acid, acrylamide, acrolein, methacrolein, methacrylamide, N-vinyl pyrollidone, acryloxypropionic acid and mixtures thereof, and (b) water-soluble comonomers of one or more of the monomers of (a) with from about 5–50% of the total monomers present, of a comonomer selected from the class consisting of itaconic acid, fumaric acid, maleic acid, hydroxypropylmethacrylate, hydroxyethylacrylate, hydroxypropylacrylate, hydroxyethylmethacrylate, acrylonitrile, methacrylonitrile, dimethylaminoethyl acrylate, dimethylaminoethyl methacrylate, t-butylaminoethyl acrylate, 4-vinyl pyridine, beta-hydroxyethyldimethylaminoethyl methacrylate salt, t-butylaminoethyl methacrylate, and mixtures thereof in the presence of a catalyst system which comprises an initiator and a metal salt wherein the molar ratio of the initiator to the metal ion is from about 10:1 to about 150:1 and the initiator is present in an amount of from about 0.5 weight percent to about 35 weight percent based on the weight of the monomers present. An aqueous polymer solution has terminal hydroxyl groups, substantially all of the water which was present during the preparation of the polymer, a solids content of from about 40% to about 60% by weight of the entire composition and said polymer has an average molecular weight of up to 50,000. The polymer is prepared from the monomers set forth above.

16 Claims, No Drawings

PROCESS FOR PREPARING LOW MOLECULAR WEIGHT WATER-SOLUBLE POLYMERS

This application is a continuation-in-part of copending application, Ser. No. 004,974, filed Jan. 22, 1979, now abandoned.

BACKGROUND OF THE INVENTION

Low molecular weight polymers and copolymers of the monomers set forth herein are useful as scale inhibitors, dispersing agents for paints, sequesterants, as detergent builders and for many other uses. When a polymer, such as polyacrylic acid, is prepared, one method of preparation is the use of a Redox catalyst system (initiator and reducing agent). Because it is believed that the use of a Redox catalyst system will result in a high molecular weight polymer (e.g. in excess of an average molecular weight of 50,000), when a low molecular weight polymer is desired, a chain transfer agent, such as a mercaptan, is incorporated during the polymerization reaction to control the molecular weight and to obtain low molecular weight materials. The use of mercaptans to control molecular weight is expensive and the mercaptan odor is undesirable and permeates the resultant product.

U.S. Pat. No. 3,635,915 discloses a copolymer of maleic acid and acrylic acid prepared by polymerizing a mixture of the monomers in water in the presence of a Redox polymerization catalyst system. This patent teaches that the polymerization reaction may be terminated in order to obtain products having desired viscosities by introducing short-stopping agents when the desired extent of polymerization has been obtained. The short-stopping agents which are set forth are methyldithiocarbamic acid, hydroquinone and, when a peroxide or persulfate is utilized as a catalyst, sodium bisulfite is utilized as the short-stopping agent.

U.S. Pat. No. 3,635,915 also teaches that copolymers of maleic acid and acrylic acid may be prepared using a thermal polymerization process. In this thermal process, the catalyst, which supplies free radical, has a short half life at elevated temperatures so that, at elevated temperatures the catalyst will decompose, thereby supplying the free radicals necessary for the polymerization reaction. The thermal process of U.S. Pat. No. 3,635,915 is ineffective in preparing low molecular weight polymers without the use of a chain transfer agent. Additionally, in order to prepare polymers of exceedingly low molecular weights, excessively large amounts of the thermally decomposable catalyst and of the chain transfer agent must be used. These excessive amounts of catalyst and chain transfer agent render this thermal process economically unsound.

U.S. Pat. No. 3,509,114 is directed to the polymerization of water-soluble acrylic monomers in aqueous solution. The patent sets forth that a Redox catalyst system may be used to prepare high molecular weight acrylic polymers.

U.S. Pat. No. 4,024,099 is directed to the preparation of very high molecular weight, water-soluble acidic polymers using a Redox catalyst system and a methylolamide or formaldehyde reagent. The patent sets forth that high catalyst to monomer ratios in polymerization reactions cause lower molecular weights in the resulting polymer. The patent also teaches that the reducing agent of the Redox catalyst system may be a metal salt such as ferrous sulfate and that the reducing reagents are used in amounts approximately equivalent to that of the peroxy catalyst.

The processes described in U.S. Pat. Nos. 3,635,915; 3,509,114; and 4,024,099 are unsuitable for preparing water-soluble low molecular weight polymers either because they are more expensive processes than the present invention or they result in the preparation of high molecular weight polymers.

U.S. Pat. No. 2,789,099 is directed to a process for polymerizing acrylic acid to yield water-soluble polymeric products. Although U.S. Pat. No. 2,789,099 is silent concerning the molar ratio of initiator to metal ion, based on calculations of the examples of U.S. Pat. No. 2,789,099, the examples disclose a molar ratio of initiator to metal ion of from 6:1 to 117,000:1. U.S. Pat. No. 2,789,099 never recognized the importance of a molar ratio of initiator to metal ion of from about 10 to 1 to about 150 to 1 in controlling the molecular weight of the polymer of the aqueous polymer solution. Further, all of the examples set forth in U.S. Pat. No. 2,789,099 show the preparation of polymers having molecular weights exceeding 50,000 based on the reported viscosities and solids content. In addition, U.S. Pat. No. 2,789,099 fails to teach or suggest that the water-soluble monomer be present in the reaction solution in an amount of from about 40% to about 60%, by weight, based on the total weight of the reaction solution.

It is highly desirable to provide an aqueous polymer solution which has a high solids content (i.e., from about 40% to about 60% by weight of the entire composition) and a low average molecular weight of up to 50,000 without introducing thioether terminal groups onto the polymer. These thioether terminal groups have an objectionable odor which makes the use of the mercaptan, which supplies the terminal thioether groups, undesirable.

It is an object of this invention, therefore, to provide a process for the preparation of a water-soluble low molecular weight polymer or copolymer, as defined herein, wherein a catalyst system is used and the molecular weight of the resultant polymer is controlled by the catalyst system itself.

Another object of this invention is to provide a process for the preparation of low molecular weight, water-soluble polymers and copolymers and controlling the molecular weight of the resultant polymer by the molar ratio of initiator to metal ion and the amount of initiator present.

A further object of this invention is to provide a process for the preparation of a low molecular weight, water-soluble polymer or copolymer wherein a mercaptan or other chain transfer agent to control molecular weight is not necessary.

An additional object of this invention is to provide an aqueous polymer solution having a high solids content and a low molecular weight and devoid of a disagreeable odor due to the presence, on the polymer, of terminal thioether groups.

Other objects and advantages will become apparent from the following more complete description and claims.

SUMMARY OF THE INVENTION

Broadly, this invention contemplates a process for preparing a water-soluble polymer having an average molecular weight of up to 50,000 comprising reacting in an aqueous solution system at a temperature of up to the boiling point of said system, from about 40% to about 60%, by weight, based on the total weight of the reaction solution, of a water-soluble monomer selected from the class consisting of (a) acrylic acid, methacrylic acid, acrylamide, acrolein, methacrolein, methacrylamide, N-vinyl pyrollidone, acryloxypropionic acid, and mixtures thereof, and (b) water-soluble comonomers of one or more of the monomers of (a) with from about 5–50% by weight of the total monomers present of a comonomer selected from the class consisting of itaconic acid, fumaric acid, hydroxyethylmethacrylate, hydroxypropylmethacrylate, hydroxyethylacrylate, hydroxypropylacrylate, acrylonitrile, methacrylonitrile, dimethylaminoethyl acrylate, dimethylaminoethyl methacrylate, t-butylaminoethyl acrylate, 4-vinylpyridine, beta-hydroxyethyldimethylaminoethyl methacrylate salt, t-butylaminoethyl methacrylate, and mixtures thereof in the presence of a catalyst system which comprises an initiator and a metal salt wherein the molar ratio of initiator to metal ion is from about 10:1 to about 150:1 and said initiator is present in an amount of from about 0.5 weight percent to about 35 weight percent based on the weight of monomer present.

This invention also contemplates an aqueous polymer solution having terminal hydroxyl groups and having present substantially all of the water present during the preparation of said polymer, said aqueous polymer solution having a solids content of from about 40% to about 60% by weight of the entire composition, said polymer having an average molecular weight of up to 50,000, said polymer being prepared from the monomers set forth in the preceding paragraph.

DETAILED DESCRIPTION

It has been surprisingly found that water-soluble polymers or copolymers having an average molecular weight of up to 50,000 can be prepared in an aqueous solution system and that the molecular weight of the resultant polymer can be controlled if the catalyst system comprises an initiator and a metal salt wherein the molar ratio of initiator to metal ion is from about 10:1 to about 150:1, and preferably from about 40:1 to about 80:1 and the initiator is present in an amount of from about 0.5% to about 35% based on the weight of monomer present.

Although the mechanism of the process set forth herein is not fully understood, it is believed that the metal salt, which is present in a limited amount, activates the initiator and then, in some manner, the metal ion is returned to its original oxidation state, possibly by further interaction with the initiator. The above is not to be construed as limiting the scope of this invention.

In the specification and claims, unless otherwise specified, all percentages are percent by weight based on the weight of monomer present.

The catalyst system comprises a water-soluble initiator and a water-soluble metal salt. The term "water-soluble" used in describing the initiator and the metal salt means that they are completely soluble, in the amounts used, in the aqueous solution system in which the water-soluble polymers or copolymers are prepared. Thus, a sparingly soluble metal salt such as cuprous bromide may be used because the amount of metal salt used may be small.

The total amount of the initiator present may vary from about 0.5 weight percent to about 35 weight percent based on the weight of monomer present and preferably from about 1 weight percent to about 20 weight percent.

Although more than about 35% may be used, the use of such greater amount of initiator is economically unwarranted. Although less than 0.5% of initiator may be used, the use of such lesser amounts is not recommended because the resultant polymer may have an average molecular weight in excess of 50,000.

It is preferred that the initiator be present in an amount of from about 1% to about 20% because excellent results have been obtained at such preferred range.

Among the water-soluble initiators which may be used are hydrogen peroxide, hydroperoxides such as t-butylhydroperoxide, sodium, potassium and ammonium persulfate, barium persulfate, acetyl peroxide, and the like.

The water-soluble metal salt is present as part of the catalyst system in an amount such that the molar ratio of initiator to metal ion is from about 10 to 1 to about 150 to 1. A ratio of less than from about 10 to 1 of initiator to metal salt is not desired because the amounts of monomer converted to the desired polymer would be low; utilization of the initiator would be inefficient; and the control of the average molecular weight of the desired polymer is diminished. If, however, the molar ratio of initiator to metal salt exceeds about 150 to 1, then utilization of the initiator in the polymerization reaction is poor and control of the average molecular weight of the product polymer is lost.

It is preferred that the molar ratio of initiator to metal salt be from about 40:1 to about 80:1 because excellent results have thereby been obtained.

Among the water-soluble metal salts which may be used are the cupric and cuprous salts, and the water-soluble salts of iron, manganese, cobalt, chromium, silver, gold, zinc, titanium, lead, calcium, cerium, such as the sulfates, chlorides, acetates, nitrates, nitrites, and phosphates and the like. When the zinc and calcium salts are used, they should be used in conjunction with one of the other metal salts.

Exemplary of the metal salts are cupric sulfate pentahydrate, ferrous sulfate heptahydrate, cuprous acetate, ferrous acetate, manganese acetate, cerium (IV) sulfate, calcium acetate, calcium sulfate, calcium nitrate, zinc acetate, zinc chloride, titanium (III) chloride, titanium (IV) chloride, lead (II) acetate, lead (IV) acetate, cupric acetate, ferric acetate hydroxide, ferrous and ferric chloride, ferrous and ferric phosphate, cuprous and cupric chloride, cuprous and cupric bromide, cupric nitrate, ferric sulfate, manganese bromide, manganese chloride, cobalt (II) acetate, cobalt (II) chloride, cobalt (II) nitrate, cobalt (II) sulfate, cerium (III) chloride, cerium (III) nitrate, cerium (III) sulfate, zinc nitrate, zinc phosphate, zinc sulfate, manganese nitrate, manganese sulfate, lead (II) chloride, lead (II) nitrate, and the like.

In a preferred embodiment, a water-soluble tertiary amine may be incorporated as part of the catalyst system. The tertiary amine is used to enhance the control of the average molecular weight of the desired polymers. Even if a tertiary amine is only sparingly soluble in water, it may be used as part of the reaction system provided that the amine used is soluble in the reaction system in the amount utilized.

The tertiary amine may be used in very minor amounts. If a tertiary amine is to be present, it may be used in a molar ratio of up to about 1 of amine to 10 of initiator. A molar ratio of 1 amine to 100 of initiator may also be used. Although a molar ratio of more than 1 amine to 10 of initiator may be used, there is no particular advantage to using such excessive amounts. If a molar ratio of less than 1 of the amine to 100 of the initiator is used, the beneficial effects of the amine toward average molecular weight control tends to be diminished.

Among the tertiary amines which may be used are the aromatic, aliphatic and heterocyclic amines, alkanol amines, tertiary aminoacids, cycloaliphatic amines, and the like.

Exemplary of such tertiary amines are triethanolamine, dimethylamino ethanol, triethylamine, tripropylamine, tributylamine, tribenzylamine, ethylenediamine tetraacetic acid, triphenylamine, triisopropanolamine, N,N-dimethyl ethanolamine, N,N diethyl ethanolamine, N,N diisopropyl ethanolamine, N-methyldiethanolamine N,N,N',N'-tetramethyl-1,3-butane diamine, N,N,N',N'-tetramethyl-1,6-hexane diamine, pyridine, 2-acetylpyridine, 2-picoline, ethyl picolinate, N-methylpiperidine, 1-methyl-5-oxo-3-pyrrolidine carboxylic acid, picolinic acid, quinaldic acid, and the like.

The water-soluble monomers which may be used in practicing this invention are acrylic acid, methacrylic acid, acrylamide, acrolein, methacrolein, methacrylamide, N-vinyl pyrollidone, acryloxypropionic acid, and mixtures thereof. These water-soluble monomers may be used to prepare water-soluble homopolymers or these monomers may be mixed with one another in any proportion to prepare water-soluble copolymers. Other comonomers, which, if used as the sole monomer, would not result in a water-soluble polymer may be used, in an amount of from about 5–50% by weight of the total monomers present, with one or more of the monomers from which homopolymers may be prepared. Among the comonomers which may be used are itaconic acid, fumaric acid, hydroxyethylmethacrylate hydroxypropylmethacrylate, hydroxyethylacrylate, hydroxypropylacrylate, acrylonitrile, methacrylonitrile, 4-vinyl pyridine, beta-hydroxyethyldimethylaminoethyl methacrylate salt, dimethylaminoethyl acrylate, dimethylaminoethyl methacrylate, t-butylaminoethyl acrylate, t-butylaminoethyl methacrylate, and mixtures thereof. Other comonomers, normally not considered as water-soluble, may also be used in limited amounts of up to about 5% by weight of the total monomers present as long as the resultant polymer is water-soluble. Among these comonomers may be mentioned vinyl acetate, styrene, vinyl toluene, alpha methyl styrene, and the like; and acrylate and methacrylate esters such as methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, secondary butyl acrylate, secondary butyl methacrylate, isobutyl acrylate, isobutyl methacrylate, ethylhexyl acrylate, ethylhexyl methacrylate, lauryl acrylate, lauryl methacrylate, stearyl acrylate, stearyl methacrylate, N,N-dialkylacrylamides such as N,N-diethylacrylamide and N-alkylacrylamide such as N-methylacrylamide, and the like. In some instances, more than 5% of these comonomers may be used. The term "water-soluble", as used herein in describing the water-soluble polymers and copolymers, means total miscibility of the polymer or copolymer with water.

In practicing the process of this invention, the polymerization may be carried out at any temperature above the freezing point of the reaction solution to below the boiling point of such solution at the pressure used, which may be above or below atmospheric pressure. It is preferred, however, to conduct the polymerization reaction at atmospheric pressure and at a temperature of from about 70° C. to about 100° C. for reasons of convenience.

The polymerization reaction is conducted until all of the monomer has been added and complete polymerization has taken place as indicated by the solids content of the solution.

The amount of monomer present in the solution may vary from about 40% by weight to about 60% by weight based on the total weight of the reaction solution. In a preferred embodiment, the amount of monomer present in the solution may vary from about 45%, by weight, to about 55%, by weight, based on the total weight of the reaction solution, and most preferably from about 45% to about 50%.

The polymerization process is practiced by dissolving the metal salt and amine, if present, in water and adding the catalyst initiator dropwise and the monomer slowly to the reaction vessel containing the metal salt and amine. Because the polymerization reaction is often exothermic in nature, by adding the monomer slowly and the catalyst initiator dropwise, an overly vigorous exotherm is avoided. The reaction is considered substantially complete when all of the monomer has been added and the exothermic nature of the reaction has ceased.

Although a chain transfer agent is not needed in practicing the process of this invention, such chain transfer agent may be used in conjunction with the process of this invention to further lower the average molecular weight of a polymer prepared by the process of the present invention.

Occasionally, the polymerization process will produce an insufficient initial exotherm so that the polymerization reaction will be slow. If this happens, then an external exotherm is supplied to provide the initial exotherm necessary for the proper rate of reaction. The initial exotherm for an otherwise slow reaction may be supplied by externally heating the reaction vessel, or by chemically providing the initial exotherm.

After the water-soluble polymer has been prepared, if it is an acid polymer, it may, if desired, be neutralized with an inorganic or organic base. Among the bases which may be used are sodium hydroxide, potassium hydroxide, ammonium hydroxide, triethanolamine, dimethylamino ethanol, ethanolamine, benzyltrimethylammonium hydroxide, and the like. The base used should be selected so that the resultant salt is water-soluble, i.e., completely miscible with water.

The manner of neutralizing a polymeric acid is well known in the art and the invention is not to be construed as limited to any particular method of neutralizing a polymeric acid.

The preferred aqueous polymer solution of this invention has a solids content of from about 40% to about 60% by weight of the entire composition and the polymer itself has an average molecular weight of up to 50,000.

It is more preferable, however, that the solids content be from about 45% to about 55% and the average molecular weight of the polymer be from about 4,000 to about 7,000.

In the most preferred embodiment, the solids content of the aqueous polymer solution is from about 45% to about 50% and the average molecular weight of the polymer is from about 5,000 to about 6,000.

The solids content of the aqueous polymer solution may be controlled during the preparation of the aqueous polymer solution by varying the ratio of water to monomer. Generally, from about 0.1 to about 1.5 parts by weight of water will be used for each part, by weight, of monomer used. The use of lesser amounts of water will result in an aqueous polymer solution having a higher solids content than the use of greater amounts of water.

In order to illustrate the nature of this invention and the manner of practicing the same, the following examples are presented.

EXAMPLE 1

To a 2-liter, round-bottom flask equipped with a mechanical stirrer, a condenser arranged to reflux, a thermometer and an inlet for gradual addition of monomer and initiator is added 12.25 grams of cupric sulfate pentahydrate; 25 grams of triethanolamine and 125 grams of water. The reactants are heated to a temperature of 90° C. and then 200 grams of aqueous hydrogen peroxide (50% active) and 500 grams of acrylamide dissolved in 333 grams of water are each separately added to the flask at a constant controlled rate over a period of 4 hours while maintaining the reaction temperature between 90° to 100° C. The reaction is complete when the addition of acrylamide and hydrogen peroxide is completed. The reaction vessel is then cooled and the product is removed therefrom.

The solids content is determined by weighing a sample of the resultant polymer solution, baking the sample at 150° C. for thirty minutes, weighing the residue after baking and calculating the percent solids. The viscosity is determined using a Brookfield model LVT viscosimeter. Molecular weight is determined by gel permeation chromatography. The degree of monomer conversion is confirmed by gas-liquid chromatography analysis.

The resultant polyacrylamide has a solids content of 52%; a viscosity of 675 cps (25° C.); and an average molecular weight of 2500 to 4000. The degree of monomer conversion is greater than 95%. The amount of hydrogen peroxide remaining in the product (as determined by an iodine/thiosulfate titration) is less than 20% of the amount used.

EXAMPLE 2

The procedure of Example 1, using the apparatus set forth in Example 1, is repeated except that 2.73 grams of ferrous sulfate heptahydrate is substituted for the cupric sulfate pentahydrate; 5 grams of dimethylamino ethanol is substituted for the triethanolamine; and 350 grams of water is used. The reaction solution is heated to 70° C. and 16.7 grams of aqueous hydrogen peroxide (30% active) and a monomer mix of 250 grams of acrylic acid and 250 grams of hydroxyethyl methacrylate are added, separately and at a constant rate over a period of 2 hours while maintaining the reaction temperature at 70° C.±10° C. The reaction vessel is cooled and the product is removed therefrom.

The resultant water-soluble polymer contains 52% solids and has a viscosity of 17,000 cps (25° C.) and an average molecular weight of 40,000 to 50,000. The degree of monomer conversion is greater than 85%. The residual hydrogen peroxide remaining in the reaction mixture is less than 20% of the amount charged. All determinations are made in the manner set forth in Example 1.

EXAMPLE 3

The procedure of Example 1, using the apparatus of Example 1, is repeated except that 3.06 grams of cupric sulfate pentahydrate is used; 10 grams of triethanolamine is used; and 360 grams of water is used. The reaction solution is heated to 95° C. and then 500 grams of acrylic monomer and 83.3 grams of aqueous hydrogen peroxide (30% active) are added separately and at a constant rate over a period of 2 hours while maintaining the reaction temperature at 95° C.±5° C. The reaction vessel is cooled and the product is removed therefrom.

The resultant polymer contains 55% solids; has a viscosity of 400 cps (25° C.) and an average molecular weight of 10,000–15,000. The degree of monomer conversion is greater than 95%. The amount of hydrogen peroxide remaining in the product is less than 10% of the amount charged to the reaction. All determinations are made in the same manner as is set forth in Example 1.

EXAMPLE 4

The procedure of Example 1, using the apparatus of Example 1, is repeated except that the metal salt used is 9.0 grams of manganese acetate tetrahydrate; 15 grams of dimethylamino ethanol is used and 300 grams of water is used. The reaction solution is heated to a temperature of 85° C. and 500 grams of methacrylic acid and 190 grams of 70% aqueous tertiary butyl hydroperoxide are added separately and at a constant rate over a period of 3 hours while maintaining the reaction temperature at between 85° to 100° C. After the addition is complete, the reaction vessel is cooled and the product is removed.

The product contains 51% solids; has a viscosity of 12,500 cps (25° C.); and an average molecular weight of 25,000–40,000. The degree of monomer conversion is greater than 85%. The amount of residual peroxide remaining in the product is less than 25% of the amount of peroxide charged.

EXAMPLE 5

The procedure of Example 1, using the apparatus of Example 1, is repeated except that the metal salt used is 2.06 g of ferrous sulfate heptahydrate and 1000 g of water is used. No tertiary amine is present. The reaction solution is heated to a temperature of 70° C. and a monomer mix consisting of 250 grams of acrylic acid and 250 grams of hydroxyethylmethacrylate and an aqueous solution of 250 grams of 70% aqueous t-butyl hydroperoxide in 250 grams of water are added separately and at a constant rate over a period of two hours while maintaining the reaction temperature at between 70°–85° C. After the addition is complete, the reaction vessel is cooled and the product is removed.

The resultant polymer contains 20% solids; has a viscosity of less than 100 cps (25° C.) and an average molecular weight of 15,000–25,000. The degree of monomer conversion is greater than 75%. The amount of peroxide residue is less than 10% of the amount charged. All determinations are made in the manner set forth in Example 1.

EXAMPLE 6

The procedure of Example 1, using the apparatus of Example 1, is repeated except that the metal salt used is 0.94 grams of cupric acetate hydrate; 5 grams of tributyl amine; and 350 grams of water are used. The reaction solution is heated to 80° C. and 25 grams of ammonium persulfate dissolved in 100 grams of water and 500 grams of acrylic acid are added separately and at a constant rate over a period of 2.5 hours while maintaining the temperature of the reaction solution at between 80°–95° C. After the addition is complete, the reaction vessel is cooled and the product is removed.

The following determinations are made as is set forth in Example 1. The resultant polymer contains 51% solids; has a viscosity of 3,000 cps (25° C.) and an average molecular weight of 25,000–35,000. The degree of monomer conversion is greater than 95%. The peroxide residue remaining in the product is less than 20% of the amount charged.

EXAMPLE 7

The procedure of Example 1, using the apparatus of Example 1, is repeated except that the metal salt used is 0.23 grams of cobalt (II) chloride hexahydrate and 450 grams of water is used. The system is heated to 85° C. and 41.5 grams of 6% aqueous hydrogen peroxide and 500 grams of acrylic acid are added separately and at a constant rate over a period of 2 hours while maintaining the reaction temperature at 85° C.±10° C. After the addition is complete, the reaction vessel is cooled and the product is removed.

The following determinations are made as is set forth in Example 1. The resultant polymer contains 50% solids; has a viscosity of 3,000 cps (25° C.) and an average molecular weight of 35,000–50,000. The degree of monomer conversion is greater than 95%. The peroxide residue remaining in the product is less than 5% of the amount charged.

EXAMPLE 8

The procedure of Example 1, using the apparatus of Example 1, is repeated except that no tertiary amine is present. The reaction vessel is cooled and the product is removed therefrom.

The following determinations are made in the manner of Example 1. The resultant polymer contains 51% solids; has a viscosity of 825 cps (25° C.) and an average molecular weight of 3,000–5,000. The degree of monomer conversion is greater than 95%. The amount of residual peroxide is less than 35% of the amount charged.

EXAMPLE 9

The procedure of Example 3, using the apparatus of Example 3 is repeated except that the triethanolamine is omitted.

The following determinations are made in the manner of Example 1. The resultant polymer contains 55% solids; has a viscosity of 500–1,000 cps (25° C.) and an average molecular weight of 12,000–25,000. The degree of monomer conversion is greater than 95%. The amount of residual peroxide is less than 30% of the amount charged.

EXAMPLE 10

The procedure of Example 3 is repeated except that 50 grams of triethanolamine is used in place of the 10 grams used in Example 3.

The following determinations are made in the manner of Example 1. The resultant polymer contains 55% solids; has a viscosity of 400 cps (25° C.) and an average molecular weight of 8,000–15,000. The degree of monomer conversion is greater than 95%. The amount of hydrogen peroxide remaining in the product is less than 5% of the amount charged.

While this invention has been described in terms of certain preferred embodiments and illustrated by means of specific examples, the invention is not to be construed as limited except as set forth in the following claims.

We claim:

1. A process for preparing a water-soluble polymer having a weight average molecular weight of from about 2,500 to 50,000 comprising reacting, under an ambient atmosphere and in an aqueous solution system wherein there is present from about 0.1 to about 1.5 parts by weight of water for each part, by weight, of monomer, said reaction conducted at a temperature up to the boiling point of said system, from about 40% to about 60%, by weight, based on the total weight of the reaction solution, of a water-soluble monomer selected from the class consisting of (a) acrylic acid, methacrylic acid, acrylamide, methacrylamide and mixtures thereof, and (b) water-soluble comonomers of one or more of the monomers of (a) with from about 5 to 50% by weight of the total monomers present of a comonomer selected from the class consisting of itaconic acid, maleic acid, fumaric acid, hydroxyethylmethacrylate, hydroxypropylmethacrylate, hydroxyethylacrylate, hydroxypropylacrylate, acrylonitrile, methacrylonitrile, dimethylaminoethyl acrylate, dimethylaminoethyl methacrylate, t-butylaminoethyl acrylate, 4-vinyl pyridine, betahydroxyethyldimethylaminoethyl methacrylate salt, t-butylaminoethyl methacrylate, and mixtures thereof in the presence of a catalyst system consisting essentially of a water-soluble initiator, a tertiary amine in a molar ratio of up to about 1 of amine to 10 of catalyst initiator, and at least one metal salt selected from the class consisting of water-soluble salts of (1) copper, iron, manganese, cobalt, chromium, silver, gold, titanium, lead and cerium and (2) one or more metal salts of (1) with metal salts of zinc or calcium, and wherein the molar ratio of said initiator to metal ion is from 10 to 1 to 150 to 1 and said initiator is present in an amount of from about 0.5 weight percent to about 35 weight percent based on the weight of monomer present.

2. A process according to claim 1 wherein said monomer is acrylic acid.

3. A process according to claim 1 wherein the water-soluble polymer is an acid polymer and is neutralized with a base.

4. A process according to claim 1 wherein said initiator is present in an amount of from about 1% to about 20% based on the weight of monomer present.

5. A process according to claim 1 wherein the monomer is present in an amount of from about 45% to about 55% of the total weight of the reaction solution.

6. A process according to claim 1 wherein said monomers include up to about 5% by weight of the total monomers present of a monomer selected from the class consisting of vinyl acetate, styrene, vinyl toluene, alpha methyl styrene, N,N-dialkylacrylamides, N-alkylacrylamide, acrylate esters and methacrylate esters.

7. A process according to claim 1 wherein the reaction is conducted at a temperature of from about 70° C. to about 100° C.

8. A process according to claim 1, wherein said tertiary amine is selected from the class consisting of aromatic amines, aliphatic amines, cycloaliphatic amines, heterocyclic amines, alkanol amines and tertiary amino acids.

9. A process according to claim 1 wherein said amine is triethanolamine.

10. A process according to claim 1 wherein said amine is dimethylamino ethanol.

11. A process according to claim 1 wherein said metal salt is cupric sulfate.

12. A process according to claim 1 wherein said metal salt is ferrous sulfate.

13. A process according to claim 1 wherein said metal salt is manganese acetate.

14. A process according to claim 1 wherein said initiator is hydrogen peroxide.

15. A process according to claim 1 wherein said initiator is tertiary butyl hydroperoxide.

16. A process according to claim 1 wherein the molar ratio of initiator to metal salt is from about 40:1 to about 80:1.

* * * * *